US005590174A

United States Patent [19]
Tsuji et al.

[11] Patent Number: 5,590,174
[45] Date of Patent: Dec. 31, 1996

[54] APPARATUS AND METHOD FOR MOBILE COMMUNICATION NETWORK WHICH ENSURES THAT A USER WHO IS OUT OF A SERVICE AREA CAN RECEIVE AN INCOMING CALL FROM ANOTHER SERVICE AREA

[75] Inventors: Toshiya Tsuji; Masahiko Yahagi, both of Tokyo, Japan

[73] Assignee: NEC Corporation, Tokyo, Japan

[21] Appl. No.: 340,374

[22] Filed: Nov. 14, 1994

[30] Foreign Application Priority Data

Dec. 17, 1993 [JP] Japan .................................. 5-318336

[51] Int. Cl.⁶ ............................................. H04Q 7/38
[52] U.S. Cl. ................................. 379/58; 379/59; 379/211
[58] Field of Search .................... 340/825.31, 825.34, 340/825.39, 825.44, 825.49, 825.02, 825.03, 825.04; 379/57, 59, 60, 210, 211, 221; 455/13.1, 13.2, 33.1, 33.2, 33.4, 34.1, 49.1, 54.1, 56.1, 70

[56] References Cited

U.S. PATENT DOCUMENTS

| | | | |
|---|---|---|---|
| 4,775,999 | 10/1988 | Williams | 379/59 |
| 4,807,279 | 2/1989 | McClure et al. | 379/211 |
| 5,222,123 | 6/1993 | Brown et al. | 379/57 |
| 5,396,540 | 3/1995 | Gooch | 379/59 |

FOREIGN PATENT DOCUMENTS

| | | | |
|---|---|---|---|
| 2004798 | 3/1992 | WIPO | 379/211 |
| 3017516 | 9/1993 | WIPO | 379/58 |

*Primary Examiner*—William Cumming
*Attorney, Agent, or Firm*—Foley & Lardner

[57] ABSTRACT

A mobile communication system provides different types of radio communications using a same mobile terminal service. One service area is provided by conventional base stations by which the mobile communication network is carried out, and another service area is provided by a fixed network terminal device, such as a cordless home phone connected in a public fixed communication network, and the mobile terminal device can be used in both service areas by switching over internal call circuit appropriately. On the other hand, a call directed to the mobile terminal device is suitably routed to the mobile terminal device in either of the service areas by a terminal device switching circuit in the mobile communication systems having a database on which location information of the mobile terminal device are registered.

11 Claims, 4 Drawing Sheets

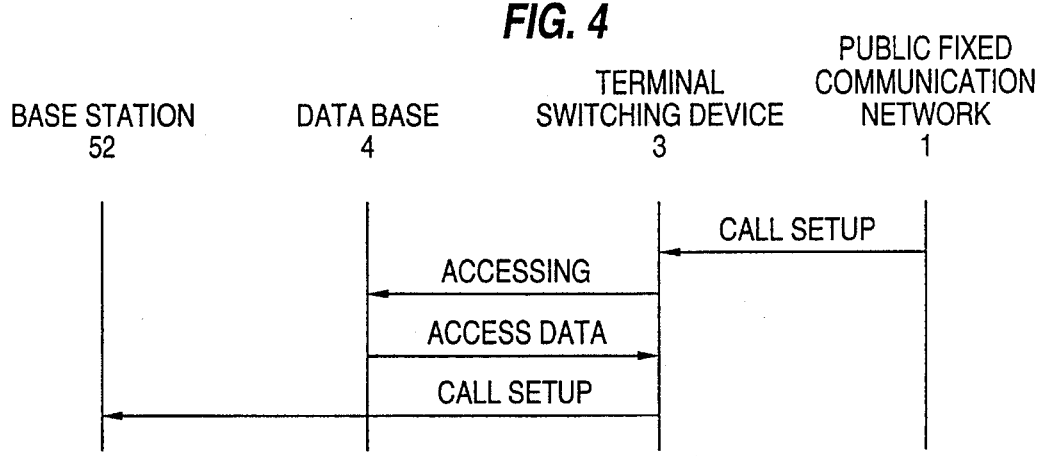
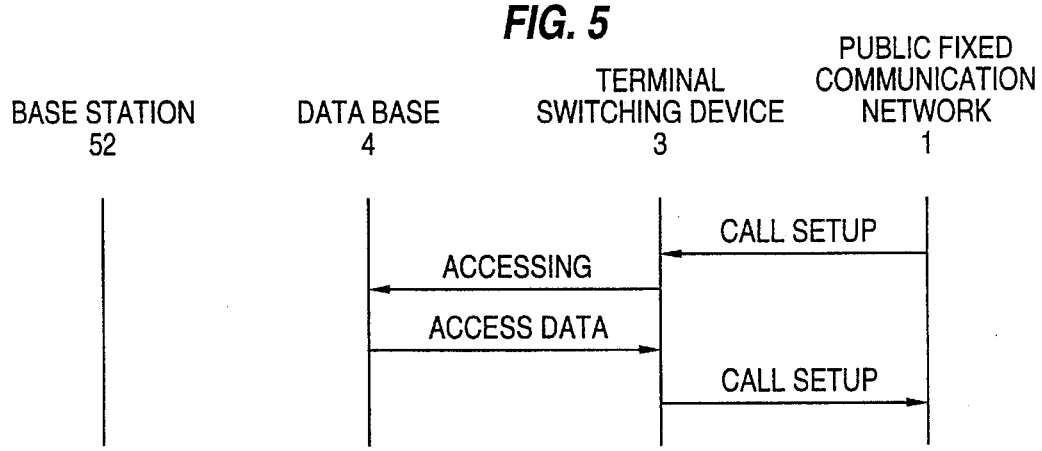
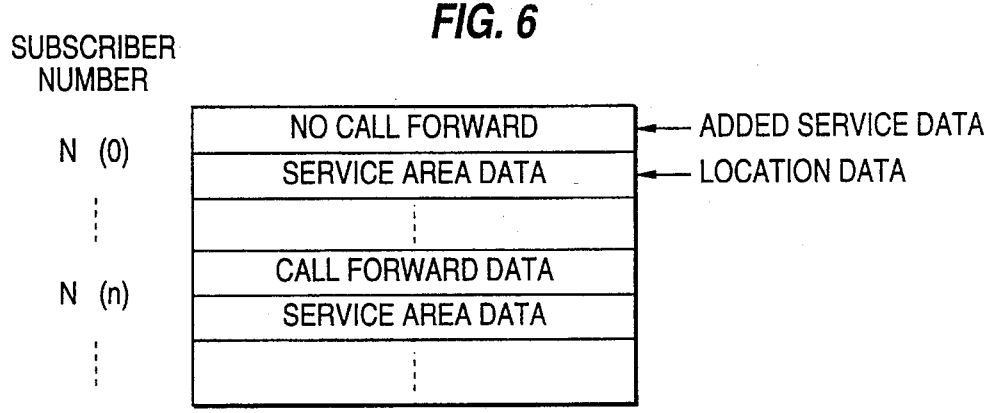

APPARATUS AND METHOD FOR MOBILE COMMUNICATION NETWORK WHICH ENSURES THAT A USER WHO IS OUT OF A SERVICE AREA CAN RECEIVE AN INCOMING CALL FROM ANOTHER SERVICE AREA

BACKGROUND OF THE INVENTION

1. Field of the Invention

The present invention relates in general to communication systems, and relates in particular to a mobile telephone communication apparatus which can be used as a child phone of a cordless home phone in a certain service area as well as a car phone or a portable phone in another service area, and a method using the apparatus.

2. Technical Background

Mobile communication through a public fixed communication network, such as portable telephones or car phones, have assumed increasing importance as a way of personal and business communications.

For example, mobile telephone communications are essential in business activities, and it is often necessary for a businessman with car phones and/or portable phones to make communication from outside of the office. Also, in the office, fixed terminal devices such as cordless home phones are provided, and it is desired to use such a car phone or a portable phone as a child phone of a cordless home phone in the office.

First, a method of accessing a mobile terminal device in the conventional mobile communication system will be explained. FIG. 1 illustrates an example of a configuration for mobile communication system connected to the public fixed communication network. A fixed terminal device 2 within the public fixed communication network (N-terminal fixed device, for short) 1, a fixed terminal device 61 for the mobile communication system (M-terminal fixed device, for short), and a terminal device switching means 3 are connected to the public fixed communication network 1, and communicate with each other through the public fixed communication network 1. The terminal device switching means 3 has a data base 4 and provides switching services for calls relating to a first service area 5, comprising base stations 50–52. The terminal device switching means 3 performs switching operations for a first portable device 8 and for a mobile terminal device 53 within the first service area 5 in accordance with the information in the data base 4. The base stations 50–52 provide radio communications with the first portable device 8 and with the mobile terminal device 53 within the first service area 5. The terminal devices 8, 53 act as a subscriber terminal of the terminal device switching means 3. The M-terminal fixed device 61 performs radio communications with a child device (second portable device) 62 located within the second service area 6. The mobile terminal device 53 and the child device 62 are utilized by the mobile terminal user 7 (user 7 for short) who is a subscriber to the mobile communication system.

The car phone system and the cordless home telephone system indicated in FIG. 1 represent typical examples of devices in such a mobile communication system. In this case, the terminal device switching means 3 corresponds to a car phone switching device; the mobile terminal device 53 to a car phone; and the M-terminal fixed device 61 to a cordless mother phone; and the child device 62 corresponds to the child device of the cordless mother phone.

In general, because car phone and cordless phone systems operate on different carrier frequencies and communications protocols, when the user 7 does not use the N-terminal fixed device 2 of the public fixed communication network 1, the user 7 must use the two different types of mobile terminal devices, first portable device 8 or the second portable device 61, mentioned above. When the N-terminal fixed device 2 tries to access the mobile terminal device (car phone) 53 by specifying the subscriber number, and if the location information of the mobile terminal device (car phone) 53 has a registered access area including the base station 52, the call sequence is as shown in FIG. 7. If the user 7 has moved into the second service area 6, the user 7 (the subscriber) is unable to respond to the call. Currently this problem is resolved by providing a call transfer as an optional service for the subscriber number assigned to the mobile terminal device (car phone) 53. As shown in FIG. 6, the data base 4 for the subscribers, N(0) to N(n), includes an optional service information and a location information. For the case of the subscriber N(0), there is no call forward service, and the subscriber does not receive any forwarded calls. For the subscriber N(n), the optional service information contains the subscriber number of the M-terminal fixed device (cordless mother phone) 61 as the call forward telephone number, then as shown in FIG. 8, the call can be forwarded to the M-terminal fixed device 61, and the user 7 is able to respond by receiving the call on the child device (second portable device) 62.

The location information in the conventional mobile communication system indicates the present location or the past location of the mobile terminal device of a given subscriber within a given service area. It follows that when the subscriber has moved out of the service area and wishes to respond to a call directed to the subscriber number, it was necessary that not only the basic connection service but the added call transfer service must be provided to complete the call operation.

SUMMARY OF THE INVENTION

The present invention presents an apparatus, as a solution to the problems of the conventional mobile communication apparatus, which ensures that a user who is out of one service area can receive an incoming call directed to the one service area without subscribing to an optional service of a call forward, and presents a method of mobile communication using the apparatus.

The communication apparatus operates in a mobile communication system comprising: a plurality of base stations for providing a first service area with radio communications with mobile terminal device means comprising a mobile terminal device means and a first portable device means operating within the first service area; a terminal device switching means operating in association with the public fixed communication network for controlling call processing of calls of the mobile terminal device means, and having data base on which location information of the mobile terminal device means are registered; and a network terminal fixed device means operating in association with the public fixed communication network for providing a second service area for radio communications with a second portable device means within the second service area; wherein the first portable device means is integrally provided with: call circuit means, providing an equivalent function to the second portable device means for radio communication with the network terminal fixed device means, the call circuit means comprising: mode switching means for choosing between a first portable device mode and a second portable device mode; and transmission circuit means for transmitting an operating status of the mode switching means to the terminal device switching means via the base stations; and the terminal device switching means being provided with: registering means for registering the operating status of the mode switching means and a subscriber number assigned to the network terminal fixed device means in the data base; and transferring means for transferring a call directed to the first portable device means to the network terminal fixed device means whose subscriber number is being registered in the data base when the operating status of the mode switching means indicates a second portable device mode.

According to the apparatus, the mobile terminal devices are provided with the overall communication circuit so that the incoming call can be forwarded to either the base station or to the network terminal fixed device in the public fixed communication network. The call is then directed to the destination, in accordance with the data registered in the data base of the terminal device switching device means.

The mode switching means can be operated manually or automatically if the receiving radio signal intensities from the base station is higher than a specified value.

Another aspect of the present invention is that when an incoming call is received at the terminal switching device, the data base contains information enabling the terminal device switching device to decide whether to forward the call via the base station or via the mobile terminal fixed device, and the terminal switching device proceeds the call establishment to a portable device in accordance with the information.

Accordingly, when the network terminal fixed device calls a subscriber number of a mobile terminal device, the user can receive the call even when the user is out of the service area in which the user had been located, without resorting to the added call forward service.

BRIEF DESCRIPTION OF THE DRAWINGS

FIG. 4 illustrates the sequence of steps when a call is forwarded from a base station to the first portable device.

FIG. 5 illustrates the sequence of steps when a call is made to a first portable device from a network terminal fixed device.

FIG. 6 shows the contents of the location information in the conventional data base.

PREFERRED EMBODIMENTS

A preferred embodiment of the present invention will be explained with reference to the drawings.

Figure 1:
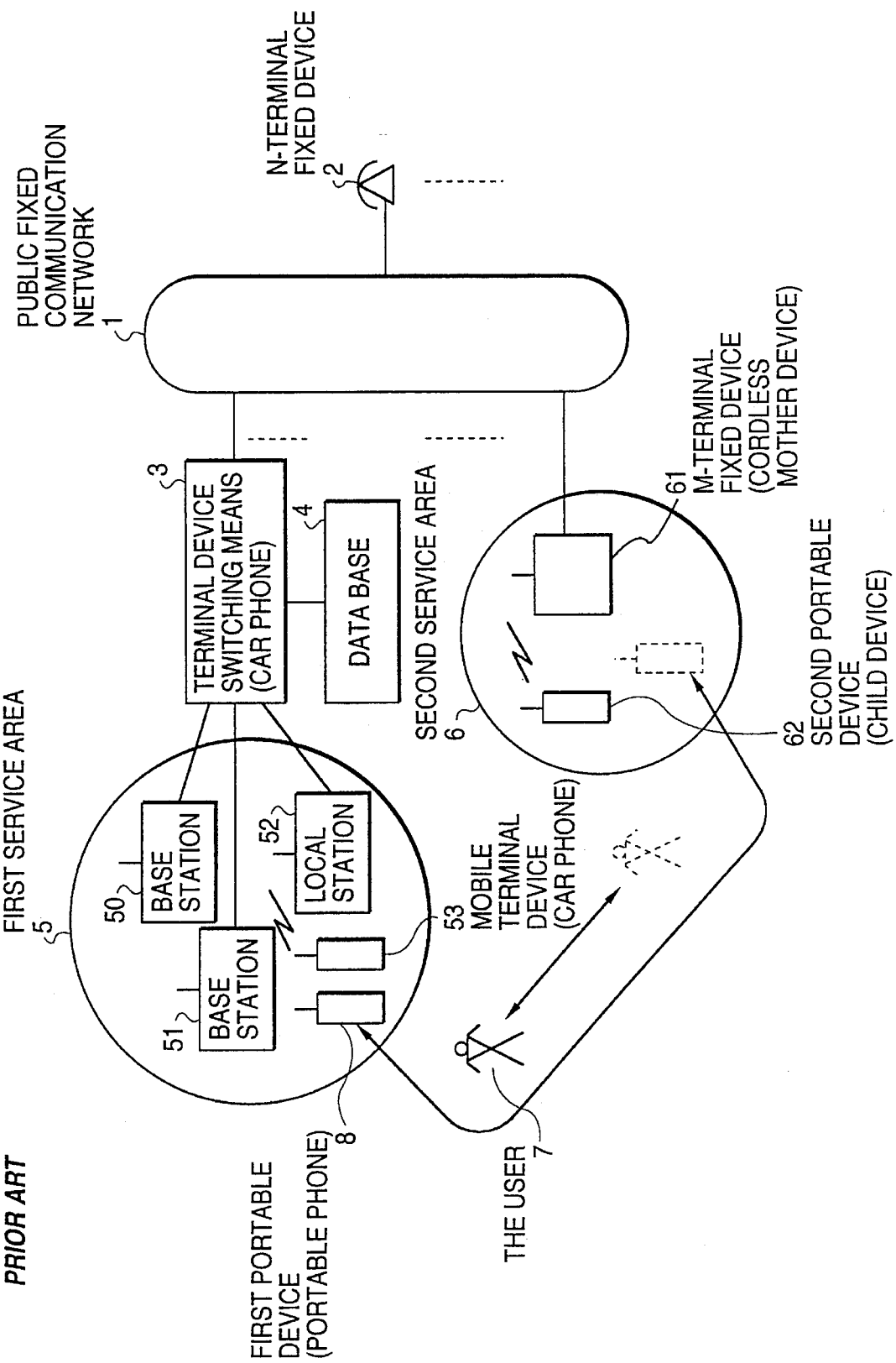
FIG. 1 is a schematic illustration of the configuration of the components in the mobile communication network used in the conventional communication system as well as in the present invention.
Figure 2:
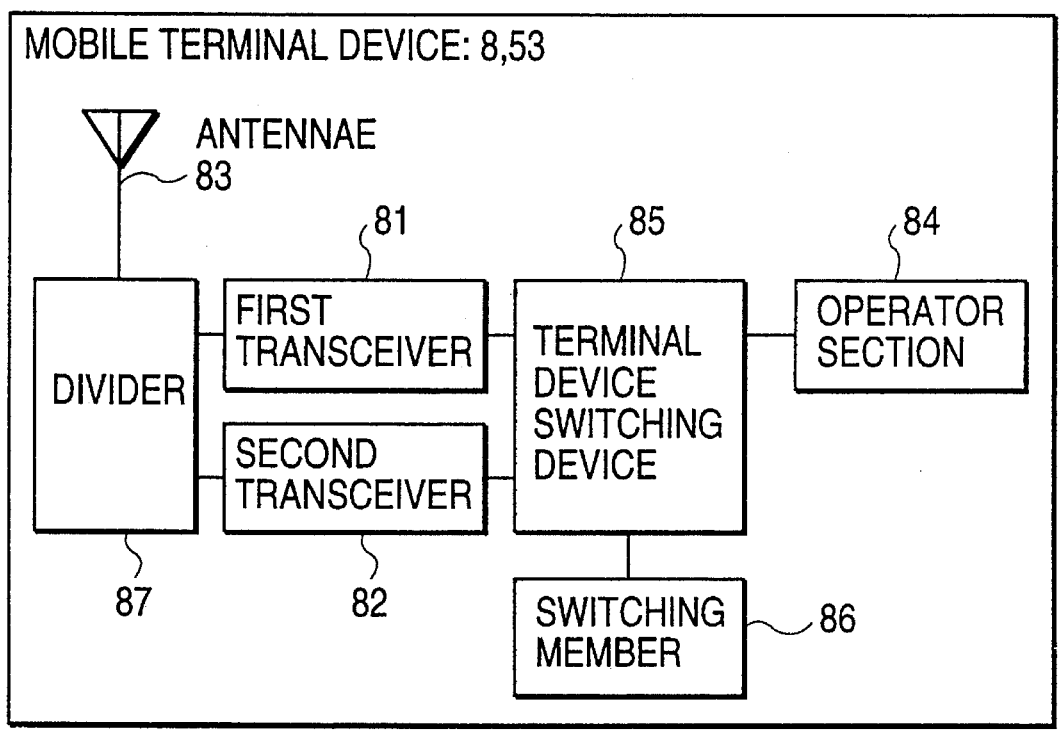
FIG. 2 is a block diagram showing the circuit configuration of the mobile terminal devices.

FIG. 1 shows the component configuration applicable to the present embodiment as well as to the conventional system. FIG. 2 is a block diagram showing the circuit configuration of the mobile terminal devices, 8 and 53.

The mobile communication system of this embodiment comprises: a terminal device switching means 3 which is a part of the public fixed communication network 1; a plurality of base stations 50, 51 and 52 located within the first service area, and controlled by the terminal device switching means 3; a first portable device 8, and a mobile terminal device 53, both of which communicate with the base stations 5, 51 and 52 within the first service area. The terminal device switching means 3 is provided with data base 4 containing location information corresponding to the respective first portable device 8 and the mobile-terminal devices 53 to enable the terminal device switching means 3 to establish calls for the devices 8, 53.

In this embodiment, the N-terminal fixed device 2 of the subscriber, and the M-terminal fixed device 61 of the mobile communication system are connected to the public fixed communication network 1. This embodiment features the M-terminal fixed device 61 to have connection means for providing a radio connection, within a second service area 6 which is smaller than the first service area 5, to communicate with the public fixed communication network 1 through the child device (second portable device) 62. A part of the first portable device 8 includes within its device structure, call circuit means for connection to the M-terminal fixed device 61. This call circuit means performs a function equivalent to the child device (second portable device) 62, and comprises: mode switching means for switching between the first portable device 8 and the child device (second portable device) 62, depending on the situation; and means for transmitting the status of the mode switching means to the terminal device switching means 3 through the base stations 50, 51 and 52. The terminal device switching means 3 comprises: registering means for registering the mode switching status information together with the subscriber number of the M-terminal fixed device 61 in the data base 4; and call forwarding means for forwarding and connecting an incoming call to the child device (second portable device) 62 of the subscriber number registered with the switching status information, when the mode switching status information indicates that the call is directed to the child device (second portable device) 62.

The mode switching means can be operated manually, or can be automatically switched to the first portable device 8 or to the second portable device 62 when the signal intensity from the base stations 50, 51 and 52 exceeds a specified level. The first portable device 8 and the mobile terminal device 53 are basically mobile device means for communicating through the base stations 50, 51 and 52 to the public fixed communication network 1. Both the first portable device 8 and the mobile terminal device 53 are therefore provided, within the same device structure, for communicating with base stations 50, 51 and 52 as well as with the M-terminal fixed device 61 as the child device (second portable device) 62. In other words, a part of the device hardware for the devices 8, 53 is designed to enable the devices 8, 53 to function as the child device (second portable device) 62 in the second service area.

FIG. 1 shows the first portable device 8 to be a portable phone, but it is obvious that the devices 8 and 53 are interchangeable, and can also be a car phone. However, to clearly distinguish the terminal devices 8, 53 and 62 in this embodiment, these terminal devices are designated as a first portable device 8, a mobile terminal device 53 and the second portable device 62.

Figure 3:
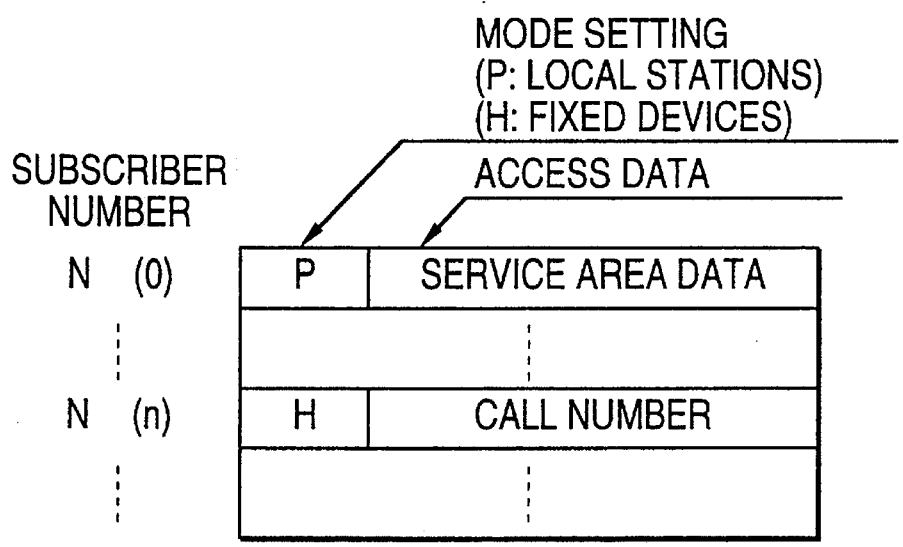
FIG. 3 shows the data configuration of the location information in the data base of the present invention.
Figure 7:
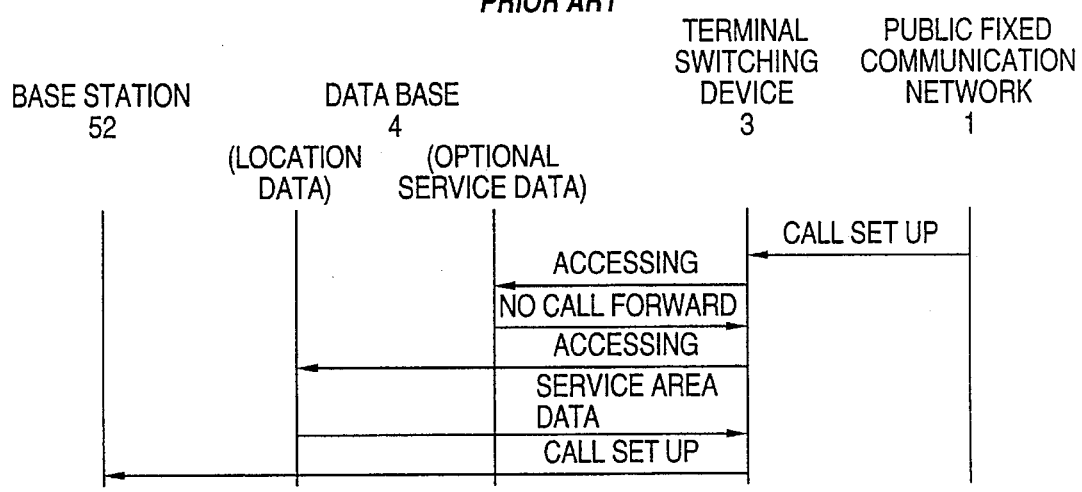
FIG. 7 shows the sequence of steps when a call is directed to a mobile terminal device from a fixed terminal device according to the conventional data base.
Figure 8:
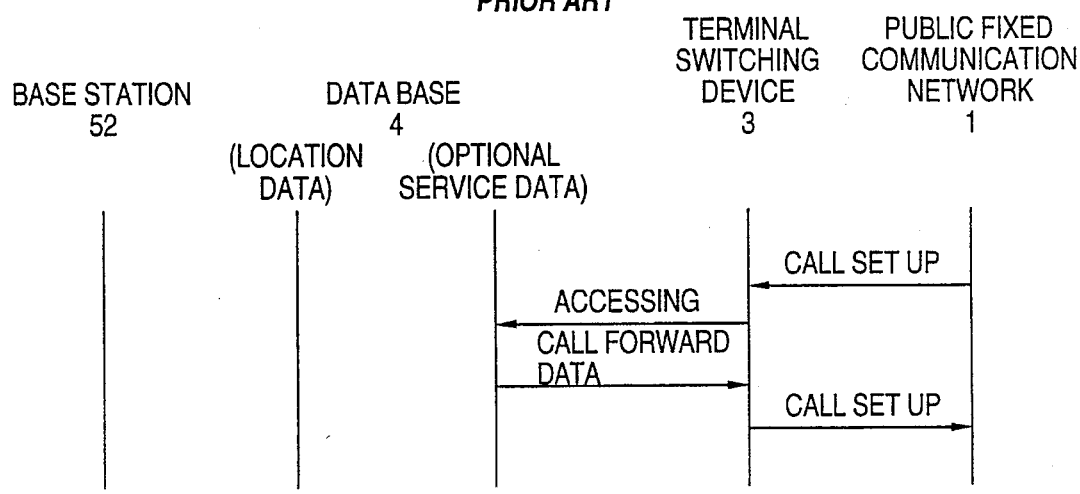
FIG. 8 shows the sequence Of steps when a mobile switching system receives a call from the public fixed communication network and establishes connection to the public fixed communication network according to the call forward service.

FIG. 3 shown an example of the location information in the data base 4 for referencing by the terminal device switching means 3. The location information is necessary for the terminal device switching means 3 for identifying the base station to be connected when a call is directed to either the first portable device 8 or to the mobile terminal devices 53. The access data for accessing either the first portable device 8 or the mobile terminal device 53 are terminal device data and the identification data for the service areas. That is, when the access data is P, the call is to be directed to the base stations 50, 51 and 52. When the access data is H, the call is to be directed to the M-terminal fixed device 61. Identification data P indicate that the first service area 5 comprising the base stations 50, 51 and 52 is being used, and identification data H indicate that the second service area 6 comprising the M-terminal fixed device 61 is being used.

The base stations 50–51 perform radio communication with either the first portable device 8 or with the mobile terminal device 53 within the first service area 5. The first terminal device 8 is used by the user 7 who is a subscriber to the mobile communication system.

The M-terminal fixed device 61 in the second service area 6 performs radio communication with the first portable device 8 in the second service area 6 using a different frequency and a different communication protocol from those used to communicate with the base stations 50–51 within the first service area 5. As in the conventional cordless telephone system, when a call is directed to the M-terminal fixed device 61 through the public fixed communication network 1, the first portable device 8 is called.

FIG. 2 is a block diagram showing the circuit configuration of the portable terminal device (portable phone). An antennae 83 is connected to a first transceiver 81 and a second transceiver 82 via a divider device 87. The first transceiver 81 is used for radio communication with the base stations 50–52, and the second transceiver 82 is used for radio communication with the M-terminal fixed device 61, and both transceivers 81, 82 are connected to the mode switching device 85. The operator section 84 includes such components as speakers, microphones, dials and display sections, and is connected to the mode switching device 85. The mode switching section 85 connects the operator section 84 to either the first transceiver 81 or the second transceiver 82 in accordance with the instructions from the switching member 86. The switching member 86 (serving as decision means) decides whether a call is to be received from the base stations 50–52 or from the M-terminal fixed device 61 in a call-waiting status.

Here, a case of calling up the first portable device 8 (portable phone) will be explained. FIG. 4 shows a sequence of steps when the first portable device 8 receives a call from the base station 52. In this case, the user 7 holding the first portable device 8 sets the switching member 86 on the first portable device 8 so as to receive the waiting call from the base stations 50–52 in the first service area 5. Let us assume that the location information in the first portable device 8 has registered therein information that the call is via the base station 52, and that the access information is the area information includes the location station 52. When the N-terminal fixed device 2 calls by the subscriber number of the first portable device 8 to talk with the user 7, the terminal device switching means 3 obtains base station 52 from the subscriber data as the access area information, and performs the call setup by specifying the access number of the first portable device 8. Next, the base station 52 begins the paging call operation for the first mobile device 8.

FIG. 5 shows the sequence of steps when the first portable device 8 receives a call from the M-terminal fixed device 61. In this case, the user 7 holds the first portable device 8, and sets the switching member 86 so as to receive a call from the M-terminal fixed device 61 within the second service area 6. Let us assume that the location information in the first portable device 8 has registered therein that the call is via the M-terminal fixed device 61, and that the access information is the subscriber number of the M-terminal fixed device 61 in the public fixed communication network 1. When the N-terminal fixed device 2 calls up the subscriber number of the first portable device 8 to talk with the user 7, the terminal device switching means 3 obtains the access number for the M-terminal fixed device 61 from the subscriber data, and then performs the call setup to the public fixed communication network 1 by specifying the access number of the M-terminal fixed device 61. Next, the public fixed communication network 1 activates the M-terminal fixed device 61, and so accesses the first portable device 8.

A method for altering the location information when the first portable device 8 moves from the first service area 5 to the second service area 6 will be explained next. When the switching member 86 is operated, location information is registered in the terminal device switching means 3 first, and a second dialing is performed to specify the M-terminal fixed device 61. Conversely, when the first portable device 8 moves from the second service area 6 to the first service area 5, the location information can be altered by following the same procedure as when the switching member 86 is operated and the power is turned on.

The foregoing embodiment is meant to be illustrative and it is clear that other device arrangement can be devised to achieve the concept of providing the terminal devices with decision means and call forward means, and the terminal device switching means with subscriber information.

What is claimed is:

1. An apparatus for providing mobile communication in association with a public fixed communication network and a subscriber communication system by a fixed terminal device connected in said public fixed communication network, said apparatus comprising:

a plurality of base stations for providing a first service area for radio communication with a mobile terminal device and a first portable device operating within said first service area;

a terminal device switching means operating in association with said public fixed communication network for controlling call processing of calls of said mobile terminal device, and having a database on which location information of said mobile terminal device are registered; and a network terminal fixed device operating in association with said public fixed communication network for providing a second service area for radio communication with a second portable device within said second service area;

wherein said first portable device is integrally provided with:

a call circuit, providing an equivalent function to said second portable device for radio communication with said network terminal fixed device, said call circuit including:

mode switching means for choosing between a first portable device mode and a second portable device mode; and transmission circuit means for transmitting an operating status of said mode switching means to said terminal device switching means via said base stations; and wherein said terminal device switching means is provided with:

registering means for registering said operating status of said mode switching means and a subscriber number assigned to said network terminal fixed device in said database; and call forwarding means for transferring a call directed to said first portable device to said network terminal fixed device whose subscriber number is being registered in said database when said operating status of said mobile switching means indicates said second portable device mode.

2. An apparatus as claimed in claim 1, wherein said mode switching means is operated manually.

3. An apparatus as claimed in claim 2, wherein said mode switching means is manually set to operate said first portable device and said second portable device when reception signal intensities exceed a specified intensity value.

4. An apparatus as claimed in claim 1, wherein said call circuit provided in said first portable device operates on a different communication frequency and response protocol than said second portable device, and said call circuit functions equivalently to said second portable device.

5. A method of radio communication using the apparatus claimed in claim 1, when said network terminal fixed device means calls up said first portable device means through a base station by the subscriber number to communicate with a user located in said first service area, the method comprising the steps of:

setting a switching number on said first portable device means so as to receive said call from a base station in said first service area;

obtaining access area information for said first portable device means from the subscriber data of said terminal device switching means;

performing a call setup by specifying an access number of said first portable device means;

paging a call for said first portable device means via said base station in said first service area; and accessing said first portable device means.

6. A method of radio communication using the apparatus claimed in claim 1, when said network terminal fixed device means calls up said first portable device means using the subscriber number to communicate with a user located in said second service area, the method comprising the steps of:

setting a switching number on said first portable device means so as to receive said call from said network terminal fixed device means in said second service area;

obtaining access area information for said network terminal fixed device means from the subscriber data of said terminal device switching means;

performing a call setup to said public fixed communication network by specifying an access number of said network terminal fixed device means;

activating said network terminal fixed device means via said public fixed communication network; and accessing said first portable device means.

7. An apparatus for providing mobile communications in a mobile communication network associated with a public fixed communication network, said apparatus comprising:

a plurality of base stations for providing a first service area for radio communication by first radio signals and first communication protocols;

a network terminal fixed device coupled to said public fixed communication network as a terminal device of said public fixed communication network for providing a second service area for radio communication by second radio signals and second communication protocols;

a mobile terminal device having call circuit operative for both of said first radio signals and first communication protocols and said second radio signals and second communication protocols, for communicating selectively in said first service area and said second service area, and for transmitting location information in a case of said operating status information being for said first service area, and for transmitting a subscriber number of said network terminal fixed device in a case of said operating status information being for said second service area;

terminal device switching means coupled to said public fixed communication network and to said plurality of base stations, for controlling call processing of calls for said mobile terminal device, and having decision means for deciding whether a call is to be routed to said first service area or to said second service area, and for directing said call in accordance with database information including operating status information and location information of said mobile terminal device and said subscriber number of said network terminal fixed device;

wherein said call circuit further comprises:

mode switching means for choosing between a first mode capable of operating in said first service area and a second mode capable of operating in said second service area; and a transmission circuit for transmitting an operating status of said mode switching means and a subscriber number of said network terminal device to said terminal device switching means via base stations; and wherein said terminal device switching means further comprises:

registering means for registering said operating status of said mode switching means and said subscriber number assigned to said network terminal fixed device, in said database; and call forwarding means for transferring a call for said mobile terminal device being directed to said first service area to said second service area provided by said network terminal fixed device whose subscriber number is registered in said database when said operating status of said mode switching means indicates said second mode.

8. An apparatus as claimed in claim 7, wherein said mode switching means is operated manually.

9. An apparatus as claimed in claim 7, wherein said mode switching means is automatically set to operate said first mode and said second mode when reception signal intensities exceed a specified intensity value.

10. A method for providing mobile communications in a mobile communications network which includes a plurality of base stations for providing a first service area with radio communication by first radio signals and first communication protocols, and which includes terminal device means for controlling call processing of calls with decision means for deciding a destination of a call to be routed and for directing said call in accordance with database information associated with a public fixed communication network, and which includes network terminal fixed device means as a terminal device of said public fixed communication network for providing a second service area with radio communication by second radio signals and second communication protocols, and which includes mobile terminal device means having a call circuit means being operative for both said first radio signals and said first communication protocols and said second radio signals and said second communication protocols, said method comprising the steps of:

setting a mode switching means provided in said mobile terminal device means for specifying an operating status for operating in said first service area;

transmitting said operating status of said mode switching means and location information of said mobile terminal device means;

registering said operating status of said mode switching means and said location information of said mobile terminal device means in said database of said terminal device switching means;

determining a route for terminating a call to said mobile terminal device means by referring to said operating status registered in said database of said terminal device switching means; and paging a call for said mobile terminal device in said first service area through a base station corresponding to said location information registered in said database of said terminal device switching means.

11. A method for providing mobile communications in a mobile communications network which includes a plurality of base stations for providing a first service area with radio communication by first radio signals and first communication protocols, and which includes terminal device means for controlling call processing of calls with decision means for deciding a destination of a call to be routed and for directing said call in accordance with database information associated with a public fixed communication network, and which includes network terminal fixed device means as a terminal device of said public fixed communication network for providing a second service area with radio communication by second radio signals and second communication protocols, and which includes mobile terminal device means having a call circuit means being operative for both said first radio signals and said first communication protocols and said second radio signals and said second communication protocols, said method comprising the steps of:

setting a mode switching means provided in said mobile terminal device means for specifying an operating status for operating in said second service area;

transmitting said operating status of said mode switching means and a subscriber number of said network terminal fixed device means in said public fixed communication network;

registering said operating status and said subscriber number of said network terminal fixed device means in said database of said terminal device switching means;

determining a route for terminating a call to said mobile terminal device means by referring to said operating status registered in said database of said terminal device switching means;

directing said call to said public fixed communication network in accordance with said subscriber number registered in said database of said terminal device switching means to terminate said call to said network fixed terminal device means; and paging a call for said mobile terminal device in said second service area through said network terminal fixed device means.

* * * * *